US012103265B2

(12) United States Patent
Draghetti

(10) Patent No.: US 12,103,265 B2
(45) Date of Patent: Oct. 1, 2024

(54) MACHINE AND METHOD FOR THE AUTOMATED PRODUCTION OF STRAWS

(71) Applicant: I.M.A. INDUSTRIA MACCHINE AUTOMATICHE S.P.A., Ozzano dell'Emila (IT)

(72) Inventor: Fiorenzo Draghetti, Ozzano dell'Emilia (IT)

(73) Assignee: I.M.A. INDUSTRIA MACCHINE AUTOMATICHE S.P.A., Ozzano dell'Emilia (IT)

( * ) Notice: Subject to any disclaimer, the term of this patent is extended or adjusted under 35 U.S.C. 154(b) by 32 days.

(21) Appl. No.: 18/009,381

(22) PCT Filed: Jun. 10, 2021

(86) PCT No.: PCT/IT2021/050179

§ 371 (c)(1),
(2) Date: Dec. 9, 2022

(87) PCT Pub. No.: WO2021/250715

PCT Pub. Date: Dec. 16, 2021

(65) Prior Publication Data

US 2023/0256700 A1 Aug. 17, 2023

(30) Foreign Application Priority Data

Jun. 10, 2020 (IT) ........................ 102020000013819

(51) Int. Cl.

*B31D 5/00* (2017.01)
*B31F 1/20* (2006.01)

(Continued)

(52) U.S. Cl.

CPC ............ *B31D 5/0095* (2013.01); *B31F 1/205* (2013.01); *B26D 3/161* (2013.01); *B26D 3/162* (2013.01); *B26D 7/0683* (2013.01); *B65B 19/34* (2013.01)

(58) Field of Classification Search

CPC ...... B31D 5/0095; B31F 1/205; B31F 1/0032; B26D 3/161; B26D 3/162; B26D 7/0683; B65B 19/34; B65B 9/02

(Continued)

(56) References Cited

U.S. PATENT DOCUMENTS 1,980,173 A * 11/1934 Bauer ..................... B31C 11/02 493/302
2,094,268 A * 9/1937 Friedman ................ B29C 53/30 215/388

(Continued)

FOREIGN PATENT DOCUMENTS

CN 210173695 U 3/2020
EP 0172395 A1 2/1986

(Continued)

OTHER PUBLICATIONS

International Search Report and Written Opinion for PCT Patent Application No. PCT/IT2021/050179 dated Sep. 10, 2021, 13 pages.

*Primary Examiner* — Thomas M Wittenschlaeger
*Assistant Examiner* — Katie L Gerth
(74) *Attorney, Agent, or Firm* — MCANDREWS HELD & MALLOY, LTD

(57) ABSTRACT

Machine (10) comprising a feed unit (16) configured to feed a plurality of tubular elements, preferably made of paper, toward different working units (18, 19, 20, 21) configured to automatically carry out different workings on the tubular elements (12), including a deformation to make a bellows (13), a cut to make a pointed end (14), or an end cut (Continued)

obliquely, a bending in correspondence with the bellows and a packaging of each straw, the deformation being carried out before the cut.

18 Claims, 3 Drawing Sheets

(51) Int. Cl.

| | |
|---|---|
| ***B65B 19/34*** | (2006.01) |
| *B26D 3/16* | (2006.01) |
| *B26D 7/06* | (2006.01) |

(58) Field of Classification Search
USPC .......................................................... 493/290
See application file for complete search history.

(56) References Cited

U.S. PATENT DOCUMENTS

| | | | | | |
|---|---|---|---|---|---|
| 2,128,564 | A * | 8/1938 | Schoen | B31C 3/00 | 493/280 |
| 2,550,797 | A * | 5/1951 | Friedman | B29C 53/30 | 239/33 |
| 2,631,645 | A * | 3/1953 | Friedman | B21D 15/06 | 29/890.047 |
| 2,985,077 | A * | 5/1961 | Strahammer | B29C 53/30 | 493/463 |
| 3,012,604 | A * | 12/1961 | Zieg | B31F 1/205 | 72/402 |
| 3,122,977 | A * | 3/1964 | Graham | B31D 5/0095 | 493/451 |
| 3,242,828 | A * | 3/1966 | Larkin | B31D 5/0095 | 493/287 |
| 3,641,884 | A * | 2/1972 | Jivoin | B29C 53/30 | 264/296 |
| 3,659,507 | A * | 5/1972 | Cushman | B31D 5/0095 | 493/454 |
| 3,751,541 | A * | 8/1973 | Hegler | B29C 49/0021 | 425/303 |
| 3,844,700 | A * | 10/1974 | Sokolow | B29B 13/024 | 425/529 |
| 3,851,441 | A * | 12/1974 | Marchand | B65B 9/042 | 53/239 |
| 4,093,496 | A * | 6/1978 | Molins | A24D 3/0287 | 493/46 |
| 4,134,247 | A * | 1/1979 | Sather | B65B 61/205 | 426/115 |
| 4,183,192 | A * | 1/1980 | Smaw | B65B 19/34 | 53/151 |
| 4,613,474 | A * | 9/1986 | Donati | B29C 59/021 | 198/803.12 |
| 4,903,458 | A * | 2/1990 | Hakansson | B65D 77/28 | 53/410 |
| 5,019,028 | A * | 5/1991 | Engel | B26F 1/26 | 83/16 |
| 6,346,211 | B1 * | 2/2002 | Rafferty | B29C 53/083 | 264/339 |
| 10,524,599 | B1 * | 1/2020 | O'Neill | B31D 5/0095 | |
| 11,117,343 | B2 * | 9/2021 | Schultz | B26D 3/16 | |
| 11,638,496 | B2 * | 5/2023 | Liao | A47G 21/18 | 493/269 |
| 2001/0002532 | A1 * | 6/2001 | Murphy | B65B 61/205 | 53/445 |
| 2003/0001002 | A1 * | 1/2003 | Haughton | B65B 61/186 | 229/103.1 |
| 2019/0069701 | A1 * | 3/2019 | O'Neill | B31F 1/205 | |
| 2021/0046724 | A1 * | 2/2021 | Schultz | B26D 1/36 | |
| 2023/0145726 | A1 * | 5/2023 | Salomäki | A47G 21/186 | 493/288 |
| 2023/0226794 | A1 * | 7/2023 | Tale | B31D 5/0095 | 493/465 |

FOREIGN PATENT DOCUMENTS

| | | |
|---|---|---|
| GB | 966806 A | 8/1964 |
| JP | H10100097 A | 4/1998 |

* cited by examiner

MACHINE AND METHOD FOR THE AUTOMATED PRODUCTION OF STRAWS

CROSS-REFERENCE TO RELATED APPLICATIONS

The present application is a National Phase Entry of PCT International Application No. PCT/IT2021/050179, which was filed on Jun. 10, 2021, which claims priority to Italian patent application No. 102020000013819, filed Jun. 10, 2020, both of which are hereby incorporated by reference in their entireties.

FIELD OF APPLICATION

The present invention relates to a machine and a method for the automated production of straws, preferably made of paper, for example to be used to drink a liquid, or semi-liquid. In particular, the machine and the method according to the present invention are capable of producing special straws for the food sector of beverage containers, such as fruit juices, or other, hermetically sealed, usually small, with a capacity around 100-200 ml, and are provided with a perforable area. Each of such straws can preferably be provided with a pointed end, or an end cut obliquely, to facilitate its insertion into the aforementioned perforable area, as well as optionally a flexible area, which allows it to be folded in two, repeatably, for packaging without damaging it.

BACKGROUND ART

The use of straws for drinking dates back thousands of years, although their diffusion has become massive starting in the last century, due to the use of straw material and the industrialization of their production.

Before the advent and enormous use of plastic materials, with which drinking straws are still produced, there was a period during which straws were produced with paper, although the production with the latter material created problems of cost, consistency, rigidity, creasing or collapse of the straws.

In an attempt to reduce environmental pollution, many countries aim to limit, if not even eliminate, where possible, the use of plastic materials, so there is now a strong need to return to producing straws, including drinking straws, using paper as the raw material.

A particular sector of drinking straws is that of small straws to be associated individually with hermetically sealed beverage containers, such as fruit juices or the like, also known as boxes, which are normally small, with a capacity around 100-200 ml, provided with a perforable area to facilitate the insertion of the straw.

Each of such straws is normally provided with a pointed end, for example with an oblique cut with respect to its longitudinal axis, to facilitate its insertion into the aforementioned perforable area of the closed container.

Such special straws are normally provided with a flexible area, for example bellows, which allows the straw itself to be folded in two, even repeatably, without damaging it. Examples of such straws are described in international patent application WO 2020/178873 filed by the Applicant.

Furthermore, for food hygiene and safety, each of such drinking straws is normally placed in its own sealed casing.

Machines and methods for the automated production of tubular products using paper as a raw material, from which to obtain drinking straws, are already known. Examples of such machines are disclosed in patent documents GB 966,806 A and U.S. Pat. No. 9,974,403.

The known machines and the related methods to produce the particular paper straws for drinking, which are also provided with a pointed end, or an end cut obliquely, and a flexible area, however, all have the drawback of being very expensive and bulky, so much so that sometimes they are a few tens of meters long, because the various working steps are carried out separately; moreover, they have the drawback of having a relatively low hourly production capacity, for which the single piece produced is quite expensive.

An object of the present invention is to make a machine and to develop a method for the automated production of straws, preferably made of paper, such that they can automatically make a flexible area on each straw, for example in an intermediate part between the two ends, and in which the machine is simple, compact, reliable, inexpensive, which can work continuously and requires little maintenance, and in which all the working steps are simple and reliable and allow to obtain a high hourly productivity, around over 1,000 straws per minute.

Another object of the present invention is to make a machine and to develop a method for the automated production of straws, preferably made of paper, such that they can automatically make, on each straw, an oblique cut at one end thereof, possibly without making working scraps.

A further object of the present invention is to make a machine and to develop a method for the automated production of straws, preferably made of paper, such that they can automatically make, on each straw, a bending, up to 180°, in correspondence with the aforementioned flexible area, to reduce the overall length of the straw itself.

A further object of the present invention is to make a machine and to develop a method for the automated production of straws, preferably made of paper, which are also able to automatically and hermetically wrap each straw on its own protective casing, after the straw itself has been shaped and made flexible in an intermediate area thereof, and/or cut obliquely at an end thereof, and/or bent up to 180° to reduce its dimension in length.

The Applicant has studied, tested and realized the present invention to overcome the drawbacks of the prior art and to obtain these and further objects and advantages.

EXPOSURE OF THE INVENTION

The present invention is expressed and characterized in the independent claims. The dependent claims show other features of the present invention or variants of the main solution idea.

In accordance with the aforementioned objects, a machine for the automated production of straws, preferably made of paper, according to the present invention comprises at least one feed unit configured to automatically feed a plurality of tubular elements, preferably made of paper, to a plurality of working units configured to perform corresponding workings on each of the tubular elements, to make the straws.

In accordance with a characteristic aspect of the present invention, the aforementioned working units comprise:

(i) a deformation unit, configured to make at least one bellows on each of said tubular elements so that said bellows is present in each straw;

(ii) a cutting unit, configured to cut each of the aforementioned tubular elements to make straws with bellows, in particular having a pointed end, or an end cut obliquely.

According to embodiments provided herein, the working units further optionally comprise:

(iii) a bending unit, configured to carry out at least one bend on each of said tubular elements, preferably in correspondence with said bellows, so as to reduce the overall length of each straw;

(iv) a packaging unit, configured to package each straw in a material suitable for each straw to be hermetically sealed for hygienic protection before its use.

In accordance with another characteristic aspect of the present invention, the deformation unit is disposed upstream of the cutting unit, with respect to an advancement direction of the tubular bodies, so that the cutting unit cuts the tubular elements only after the deformation unit has carried out the bellows on the tubular elements. "Advancement direction" of the tubular bodies means the direction in which the tubular bodies advance from upstream to downstream, i.e., from the aforementioned feed unit, through the subsequent working units, to the aforementioned packaging unit.

In accordance with another characteristic aspect of the present invention, the deformation unit is configured to make the at least one bellows as a flexible shaped portion defined by a succession of ridges and annular grooves obtained on the tubular elements.

In accordance with another characteristic aspect of the present invention, the deformation unit is configured to make two bellows distanced on each of the tubular elements before they are cut by the cutting unit.

In accordance with another characteristic aspect of the present invention, the cutting unit is configured to cut each of the tubular elements in a portion comprised between the two bellows.

In accordance with another characteristic aspect of the present invention, the cutting unit is disposed and configured so as to cut each tubular element along a transverse direction with respect to the longitudinal extension of the tubular element, so as to make a pointed end.

In accordance with another characteristic aspect of the present invention, the aforementioned deformation unit, the aforementioned cutting unit, the aforementioned bending unit and the aforementioned packaging unit are present in sequence, and preferably without break in continuity.

According to another characteristic aspect of the present invention, there is a distancing unit, disposed downstream of the feed unit and configured to distance the aforementioned tubular elements from each other and bring them to a determinate distance, at a constant pitch each one from the other.

According to another characteristic aspect of the present invention, the aforementioned one feed unit comprises feeding means configured to convey the aforementioned plurality of tubular elements, also initially disposed haphazardly, toward a first cylindrical member rotating around a first axis of rotation thereof and provided with one or more peripheral seatings parallel to the aforementioned first axis of rotation, each of which is configured to temporarily receive and hold one of the aforementioned tubular elements. It should be noted that in the following description and in the claims, cylindrical member means a mechanical member, even complex, which as a whole has substantially the shape of a cylinder.

According to another characteristic aspect of the present invention, the aforementioned feeding means comprise at least one conveyor belt having a terminal portion disposed in the proximity of a distributor member configured to vertically stack one on top of the other the aforementioned tubular elements coming from the aforementioned conveyor belt to then exit, one at a time, toward the aforementioned first rotating cylindrical member.

According to another characteristic aspect of the present invention, the aforementioned cutting unit comprises both another cylindrical member rotating around an axis of rotation thereof and provided with a plurality of gripping elements configured to receive and temporarily hold the aforementioned tubular elements, and a circular blade rotating around an axis of rotation thereof and configured to obliquely cut the aforementioned tubular elements; furthermore, the aforementioned axis of rotation of the aforementioned circular blade and the aforementioned axis of rotation of the aforementioned another cylindrical member form a determinate angle between them, preferably between 30° and 60°, even more preferably of 45°.

According to another characteristic aspect of the present invention, the aforementioned gripping elements are configured to move automatically and in an alternate manner, due to the rotation of the aforementioned another cylindrical member and cam means associated with the latter, parallel to the aforementioned axis of rotation of the aforementioned another cylindrical member between a first operating position in which the aforementioned gripping elements are closer to each other, before and during the cutting of the corresponding tubular element by the aforementioned circular blade, and a second operating position in which the aforementioned gripping elements are distanced from each other, after the aforementioned cutting, and vice versa, whereby two straws are formed from each of the aforementioned tubular elements.

According to another characteristic aspect of the present invention, the said packaging unit comprises another cylindrical member rotating around an axis of rotation thereof; furthermore, a first thin film of the aforementioned suitable material is configured to be partially wrapped on the aforementioned further cylindrical member; the aforementioned first thin film partially wrapped on the aforementioned further cylindrical member is configured to receive the straws; a second thin film of the aforementioned suitable material is configured to be disposed on the straws, so that the latter are sandwiched between the aforementioned two thin films.

According to another characteristic aspect of the present invention, the aforementioned packaging unit further comprises first heat-welding means, configured to weld together the aforementioned two thin films in a direction transverse to their advance toward a support member disposed downstream of the aforementioned another cylindrical member, and second heat-welding means, configured to weld the aforementioned two thin films together in a longitudinal direction, i.e., parallel to their advance toward the aforementioned support member.

According to a further characteristic aspect of the present invention, a method for the production of straws, preferably made of paper, comprises a feeding step in which a plurality of tubular elements, preferably made of paper, are fed to a plurality of working units configured to carry out corresponding workings on each of the aforementioned tubular elements, to make the straws, in which the aforementioned working units allow to carry out at least:

(i) a deformation step, during which at least one bellows is made on each of said tubular elements so that the aforementioned bellows is present in each straw;

(ii) a cutting step, during which each of the aforementioned tubular elements is cut to make straws with bellows, in particular provided with a pointed end, or an end cut obliquely on each straw.

In accordance with embodiments of the method described herein, the method can further optionally comprise:

(iii) a bending step, during which at least one bend is carried out on each of said tubular elements, preferably in correspondence with said bellows, so as to reduce the overall length of each straw;

(iv) a packaging step, during which each straw is packaged in a suitable material so that each straw is hermetically sealed to be hygienically protected before the use thereof.

In accordance with a further characteristic aspect of the present invention, the deformation step for making the bellows is carried out prior to the cutting step for making the straws with bellows.

In accordance with a further characteristic aspect of the present invention, in the deformation step the bellows is made as a flexible shaped portion defined by a succession of ridges and annular grooves.

In accordance with a further characteristic aspect of the present invention, in the deformation step two bellows distanced from each other are made on each of the tubular elements.

In accordance with a further characteristic aspect of the present invention, in the cutting step each of the tubular elements is cut in a portion comprised between the two bellows.

In accordance with a further characteristic aspect of the present invention, said deformation step, said cutting step, said bending step and said packaging step are present in sequence and preferably without break in continuity.

In accordance with a further characteristic aspect of the present invention, the method further comprises a distancing step for distancing said tubular elements from each other and bringing them to a determinate distance, at a constant pitch each one from the other.

ILLUSTRATION OF THE DRAWINGS

These and other aspects, features and advantages of the present invention will become clear from the following embodiment description, given as a non-limiting example, with reference to the attached drawings in which.

It should be noted that in the present description and in the claims, the terms vertical, horizontal, lower, upper, right, left, high, low, front and rear, with their variations, have the sole function of better illustrating the present invention with reference to the figures of the drawings and must not be used in any way to limit the scope of the invention itself, or the scope of protection defined by the appended claims. For example, the term vertical is meant to indicate an axis, or a plane, which can be either perpendicular to the horizon line or inclined, even by several degrees, for example up to 20°, with respect to such a perpendicular position.

Furthermore, those skilled in the art will recognize that certain dimensions, or features, in the figures may have been enlarged, deformed, or shown in an unconventional, or non-proportional manner to provide a version of the present invention which is easier to understand. When dimensions and/or values are specified in the following description, the dimensions and/or values are provided for illustrative purposes only and are not to be construed as limiting the scope of protection of the present invention, unless such dimensions and/or values are present in the appended claims.

DESCRIPTION OF AN EMBODIMENT OF THE PRESENT INVENTION

An example of an embodiment of the invention is now described, which refers to the accompanying figures. Such an embodiment example is provided as an illustration of the invention and is not intended as a limitation thereof. It is understood that the scope of protection of the present invention will be inclusive of such modifications and variations.

Figure 1:
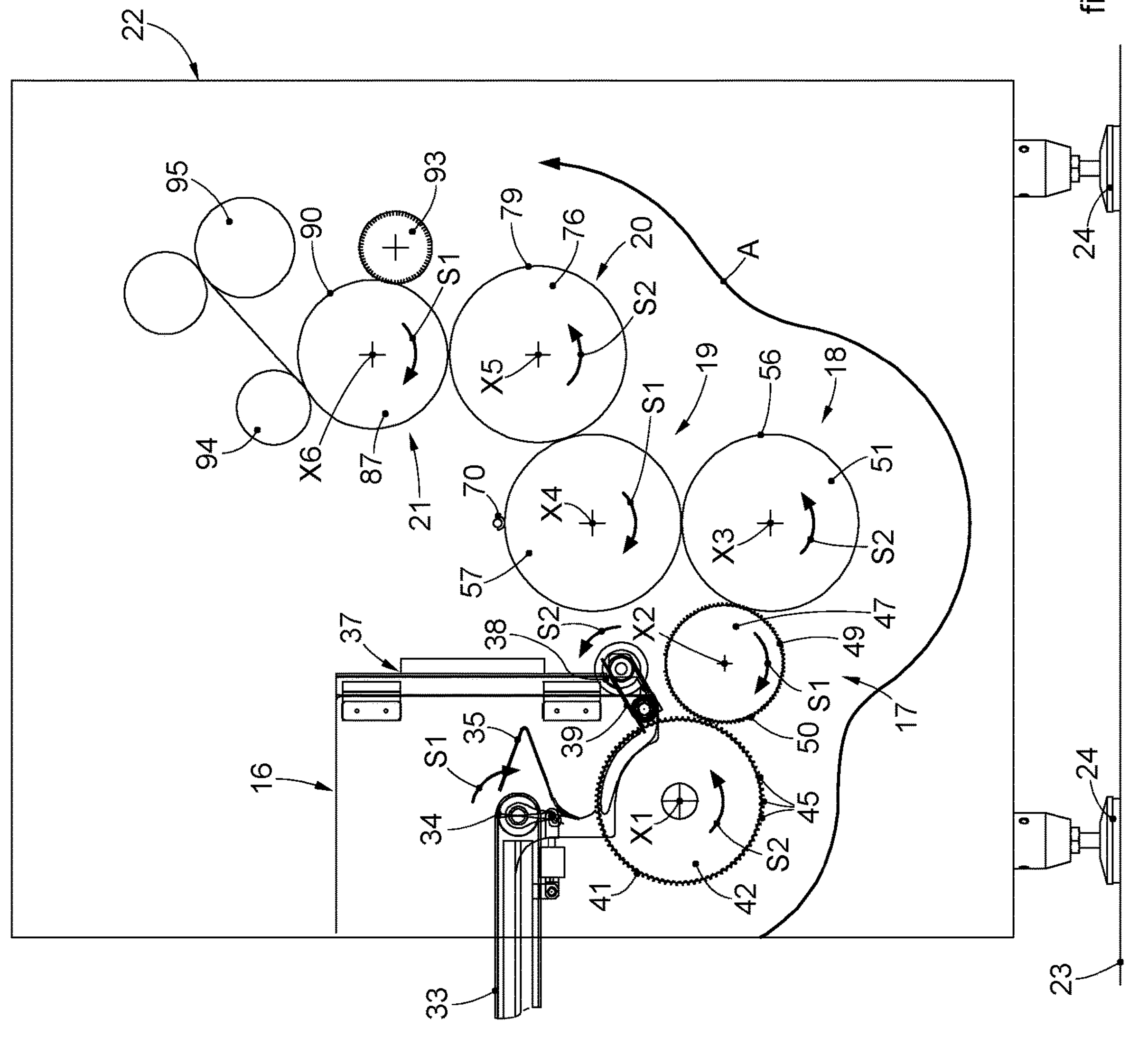
FIG. 1 is a schematic front view of a machine for the automated production of straws according to the present invention.
Figure 2:
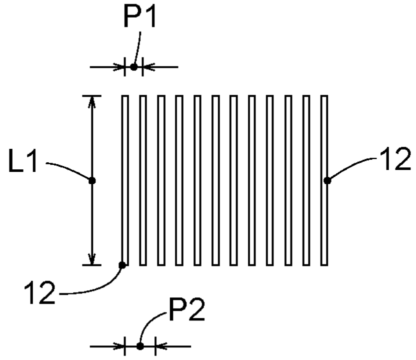
FIG. 2 is a schematic view of some tubular elements used to produce straws by the machine of FIG. 1, distanced from each other by a first pitch P1.

FIG. 1 depicts a schematic diagram of a machine 10 for the automated production of straws 11 (FIG. 7), preferably made of paper, according to the present invention, which occurs starting from tubular elements 12 (FIG. 2) already made, for example using a known machine, or which will be developed in the future.

Merely by way of illustration and in order to better frame one of the fields of application of the present invention, each tubular element 12 can have an external diameter comprised between about 2 mm and about 20 mm, preferably between about 4 mm and about 10 mm, a thickness of the tubular wall between about 0.2 mm and about 0.5 mm, and a length L1 between about 100 mm and about 400 mm.

Figure 4:
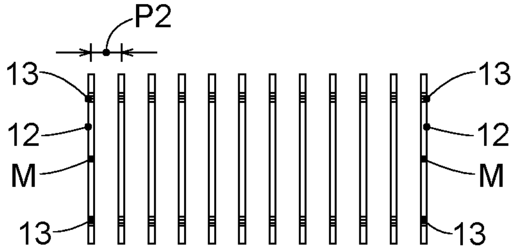
FIG. 4 is a schematic view of the tubular elements of FIG. 2, in which two bellows have been made on each thereof.
Figure 5:
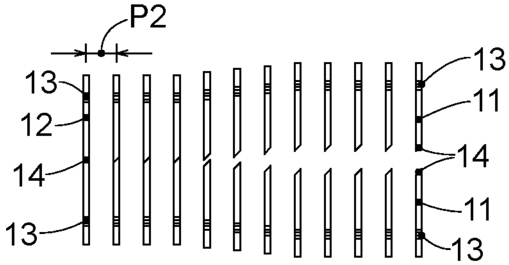
FIG. 5 is a schematic view of the tubular elements of FIG. 2, in which a sequence of an oblique cut in the median point of each thereof and the mutual distancing of the two halves thereof is shown, to form two straws from each thereof.

To make the straws 11, each tubular element 12 is first shaped to form thereon at least one bellows 13 (FIG. 4), in this case two, preferably each close to one end thereof, and then cut to make at least one pointed or obliquely cut end 14 (FIG. 5). In particular, by cutting each tubular element 12 in half, in a midpoint M (FIG. 4) two straws 11 are made, aligned and mirrored with each other, each of which has a bellows 13 and an obliquely cut end 14 (FIG. 5).

Figure 6:
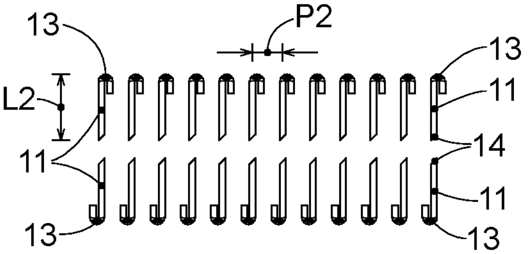
FIG. 6 is a schematic view of the straws of FIG. 5, on each of which a bending has been made in correspondence with the bellows.
Figure 7:
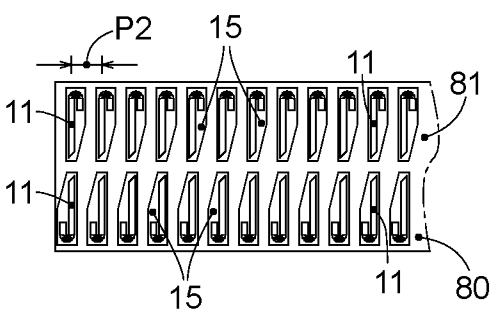
FIG. 7 is a schematic view of the straws of FIG. 6 packaged individually.

Each straw 11 is then folded in correspondence with the bellows 13 thereof (FIG. 6), for example by about 180°, to reduce the overall length thereof, and at the end it is individually packaged, each in its own sealed casing 15 (FIG. 7).

In the embodiment disclosed herein, the machine 10 (FIG. 1) comprises, in summary and sequence, the following working units, each of which is configured to automatically carry out a corresponding working step, as will be described in detail below: a feed unit 16, a distancing unit 17, a deformation unit 18, a cutting unit 19, a bending unit 20, and a packaging unit 21.

In a simplified version of the machine 10, not depicted herein, but easily understood by those skilled in the art, the distancing unit 17 could be eliminated, as will be explained further below.

All five working units 16, 17, 18, 19, 20 and 21 are mounted on a support structure 22 (FIGS. 1 and 8), which is configured to be supported on a horizontal plane 23 (FIG. 1), for example consisting of a floor, by means of the support feet 24 thereof.

All five working units 16, 17, 18, 19, 20 and 21 are controlled by a central control unit 29 (FIG. 8) contained in a control panel 30 disposed at the top of the support structure 22, so as to be easily accessible by an operator.

In detail, the feed unit 16 (on the left in FIG. 1), comprises a substantially horizontal conveyor belt 33; a chute 35 is positioned in correspondence with a terminal portion 34 thereof. The rotation of the conveyor belt 33 in a first rotation direction S1, for example clockwise if viewed from the front of the machine 10, is controlled by a motor element of a known type, or which will be developed in the future, for example an electric motor, not depicted in the drawings, which is controlled by the central control unit 29.

The conveyor belt 33 is configured to feed a plurality of tubular elements 12 (FIG. 2), disposed thereon also haphazardly, or randomly, toward a distributor member 37 (FIG. 1) disposed near the chute 35.

The distributor member 37 is configured to vertically stack one on top of the other the tubular elements 12 coming from the conveyor belt 33 so that they then exit, one at a time, from a lower end 38 thereof toward an underlying conveyor belt 39, inclined downwards and rotatable, on corresponding pulleys, in a second rotation direction S2, opposite the first rotation direction S1, by a motor member of a known type, or which will be developed in the future, for example an electric motor, not depicted in the drawings, which is also controlled by the central control unit 29.

The conveyor belt 39 (FIG. 1) has a lower terminal part thereof close to a peripheral surface 41 of a first cylindrical member 42, also rotatable in the second rotation direction S2, around a first axis of rotation X1, substantially horizontal.

The first cylindrical member 42 is rotated by a motor member of a known type, or which will be developed in the future, for example an electric motor, not depicted in the drawings, which is also controlled by the central control unit 29 so that the first cylindrical member 42 has a determinate first peripheral speed V1, which is chosen as a function of the productivity of the machine 10 to be obtained, understood as the number of straws 11 produced in the time unit, which, indicatively, in the machine 10 of the present embodiment, is over 1,000 per minute.

In particular, in the example provided herein, the peripheral surface 41 (FIG. 1) of the first cylindrical member 42 is provided with a plurality of semicylindrical seatings 45, open outwardly, parallel to the first axis of rotation X1 and uniformly angularly distanced by a determinate first pitch P1 (FIG. 2), which is slightly larger than the external diameter of each tubular element 12. The semicylindrical seatings 45 are configured to temporarily and individually receive the tubular elements 12 coming from the conveyor belt 39, while the first cylindrical member 42 is rotating.

Furthermore, a guide member 46 (FIG. 8), fixed to the support structure 22, is partly disposed around the first cylindrical member 42, with a circular development of about 270°, with the function of preventing the tubular elements 12 temporarily positioned in the semicylindrical seatings 45 from exiting the latter except when each tubular element 12, brought in rotation of the first cylindrical member 42, comes as close as possible to the distancing unit 17 (FIG. 1), to be transferred on the latter.

The distancing unit 17 is placed immediately downstream of the feed unit 16 and comprises a second cylindrical member 47 rotatable in the first rotation direction S1, i.e., opposite that of the first cylindrical member 42, around a second axis of rotation X2, also substantially horizontal and rotated by a motor member of a known type, or which will be developed in the future, for example an electric motor, not depicted in the drawings, which is also controlled by the central control unit 29.

Figure 3:
FIG. 3 is a schematic view of the tubular elements of FIG. 2, but distanced from each other by a second pitch P2>P1.

The second cylindrical member 47 (FIG. 1) has a peripheral surface 49 substantially tangent to the surface 41 of the first cylindrical member 42 and provided with a plurality of semicylindrical seatings 50, parallel to the second axis of rotation X2 and equal to the semicylindrical seatings 45 of the first cylindrical member 42, but angularly distanced from each other by a determinate second pitch P2 (FIG. 3) which is approximately 1.5 to 2 times greater than the first pitch P1. Each semicylindrical seating 50 is configured to temporarily house a tubular element 12 coming from the first cylindrical member 42, while the second cylindrical member 47 is rotating.

The distancing unit 17 only has the function of distancing the tubular elements 12 more angularly from each other, for an easier workability thereof in the other downstream working units, i.e., in the deformation unit 18, the cutting unit 19, the bending unit 20 and the packaging unit 21, where the angular distance between the tubular elements 12/straws 11, remains the same (second pitch P2), as will be described in detail below.

The greater angular distancing of the tubular elements 12 is obtained by commanding the second cylindrical member 47 to rotate at a second peripheral speed V2 which is higher than the first peripheral speed V1 of the first cylindrical member, in the ratio V2:V1=P2:P1.

The deformation unit 18, is placed immediately downstream of the distancing unit 17 and is configured to make, by deformation means known per se, or which will be developed in the future, at least one bellows 13 (FIG. 4) on each tubular element 12. The aforementioned deformation means are not described herein, because they fall outside the scope of the present invention.

In particular, in the example provided herein, the deformation unit 18 is configured to make, on each tubular element 12, two bellows 13 equidistant from a median point M of the tubular element 12 and positioned closer to the ends of the tubular element 12 with respect to the median point M.

Briefly, the deformation unit 18 comprises a third cylindrical member 51 rotatable in the second rotation direction S2 around a third axis of rotation X3, also substantially horizontal.

The third cylindrical member 51 has a larger external diameter than that of the second cylindrical member 47, for example in a ratio of about 1.5:1, and is rotated so that the peripheral speed V2 of the two cylindrical members 47 and 51 is the same.

The third cylindrical member 51 (FIG. 1) has a peripheral surface 56 substantially tangent to the peripheral surface 49 of the second cylindrical member 47 and suitable to support and temporarily hold the tubular elements 12, parallel to the third axis of rotation X3 and angularly equidistant from each other of the second pitch P2.

Therefore, since the circumferential extension of the peripheral surface 56 is greater than that of the peripheral surface 49, on the peripheral surface 56 there are a greater number of seatings, not depicted in the drawings, to house the tubular elements 12, angularly distanced from each other of the second pitch P2.

The cutting unit 19 is located immediately downstream of the deformation unit 18 and is configured to make an oblique cut, with respect to the longitudinal axis of each tubular element 12, in correspondence with the midpoint M of the latter (FIG. 4), already provided with the two bellows 13, to cut it into two equal parts and thus obtain, from each tubular element 12, two straws 11 equal to each other and mirrored, each already provided with a bellows 13, and at the same time make the obliquely cut terminal portion 14 on each of the two straws 11 in the forming step.

In particular, the cutting unit 19 comprises a fourth cylindrical member 57 (FIG. 1), substantially tangent to the third cylindrical member 51, having substantially the same external diameter as the latter and rotating in the first rotation direction S1, around a fourth axis of rotation X4, substantially horizontal. To reduce the overall dimensions of the machine 10, the fourth cylindrical member 57 is positioned above the third cylindrical member 51.

The fourth cylindrical member 57 is rotated so that it also has the same peripheral speed V2 as the two cylindrical members 47 and 51.

The cutting unit 19 further comprises a circular blade 60 (FIG. 8), having an axis of rotation thereof which is inclined at a certain angle with respect to the fourth axis of rotation X4, preferably between 30° and 60°, still more preferably 45°, and rotatable by an electric motor 61, also controlled by the central control unit 29. The position in the space of the cutting profile of the circular blade 60 is such as to interfere with the tubular elements 12 positioned on the periphery of the fourth cylindrical member 57 while it rotates.

In the example provided herein, the fourth cylindrical member 57 is provided peripherally with a plurality of gripping elements 70 (FIGS. 1 and 9), of a known type, or which will be developed in the future, which are configured to receive and temporarily hold the tubular elements 12. The rotation of the fourth cylindrical member 57 causes each tubular element 12 to be brought under the sharp profile of the circular blade 60, which makes a precise and oblique cut with respect to the longitudinal axis of the same tubular element 12 without producing working scraps.

Figure 9:
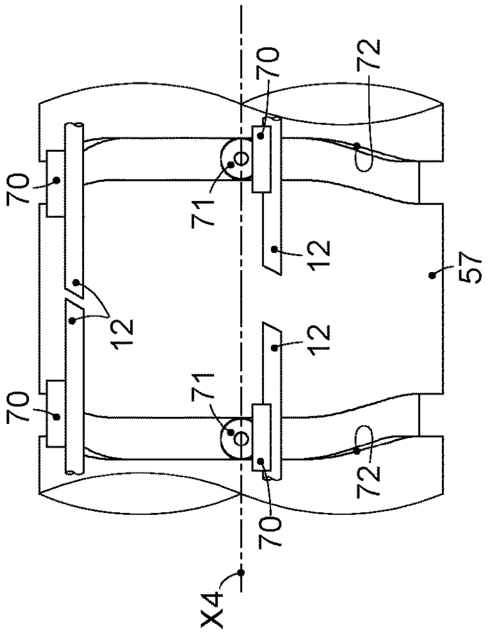
FIG. 9 is a partial and schematic side view of a working unit comprised in the machine of FIG. 1.

Furthermore, the aforementioned gripping elements are configured to move, due to the rotation of the fourth cylindrical member 57 and the presence of cam means, of a known type, or which will be developed in the future, which are for example associated with the same fourth cylindrical member 57, automatically and in an alternate manner parallel to the axis of rotation X4, between a first operating position, in which the aforementioned gripping elements are closer to each other, before and during the cutting of the corresponding tubular element 12 by the circular blade 60 (at the top in FIG. 9), and a second operating position, in which the aforementioned gripping elements are distanced from each other, after the aforementioned cut, and vice versa (in FIG. 9 near the fourth axis of rotation X4). In the illustrated example, the cam means are configured as a coupling between a wheel 71, which acts as a cam-follower and is associated with the gripping element 70, and a shaped circumferential groove 72, which acts as a cam profile, closed, and extending circumferentially on the fourth cylindrical member 57.

Thereby, two pointed ends 14 are simultaneously made, each on one of the two pieces of the tubular element 12, which thus become two straws 11 in the forming step each provided with a bellows 13 (FIG. 5).

Immediately after the cutting of each tubular element 12, for the further rotation of the fourth cylindrical member 57 (FIG. 8), the two gripping elements which grasped the same tubular element 12, are distanced from each other, due to the aforementioned cam means, whereby the two halves of the tubular element 12 (FIG. 5), i.e., the two straws 11 in the forming step, detach from each other by a certain distance, for example by a few millimetres.

The bending unit 20 (FIGS. 1 and 8) is configured to make, by means of bending means known per se, or which will be developed in the future, at least one bend, for example at about 180°, of each straw 11 in the forming step, in correspondence with the bellows 13 thereof (FIG. 6). The aforementioned bending means are not described herein, because they fall outside the scope of the present invention.

In the example provided herein, the bending unit 20 is configured to simultaneously bend two straws 11 in the forming step, which come, in pairs, from the cutting unit 19 (FIG. 8) described above.

Briefly, the bending unit 20 comprises a fifth cylindrical member 76 (FIG. 1) substantially tangent to the fourth cylindrical member 57, having substantially the same external diameter as the latter and rotating in the second rotation direction S2, around a fifth axis of rotation X5, substantially horizontal. To reduce the overall dimensions of the machine 10, the fifth cylindrical member 76 is positioned laterally with respect to the fourth cylindrical member 57 and on the opposite side with respect to the feed unit 16.

The fifth cylindrical member 76 is also rotated so that the fifth cylindrical member 76 also has the same peripheral speed V2 as the three cylindrical members 47, 51 and 57.

The fifth cylindrical member 76 (FIG. 1) has a peripheral surface 79 substantially tangent to the peripheral surface 56 of the fourth cylindrical member 57 and suitable to support and temporarily hold the straws 11 in the forming step, two by two axially aligned with each other, parallel to the fifth axis of rotation X5 and angularly equidistant, from the adjacent pair, of the second pitch P2 (FIG. 6).

The packaging unit 21 (FIG. 1) is positioned immediately downstream of the bending unit 20 and is configured to package each straw 11 already bent and arriving from the bending unit 20, enclosing it between a first thin film 80 (FIGS. 7 and 8) and a second thin film 81, both of suitable material, for example of the transparent food type, preferably biodegradable, and coming from two corresponding rolls 82 and 83 (FIG. 8), first and second, rotatably mounted on corresponding horizontal support shafts 85 and 86 pivoted on the fixed structure 22.

The packaging unit 21 further comprises a sixth cylindrical member 87 (FIGS. 1 and 8) substantially tangent to the fifth cylindrical member 76, having a slightly smaller external diameter than the latter and rotating in the first rotation direction S1, around a sixth axis of rotation X6, substantially horizontal. To reduce the lateral dimensions of the machine 10, the sixth cylindrical member 87 is positioned above the fifth cylindrical member 76.

The sixth cylindrical member 87 is also rotated at the same peripheral speed V2 as the four cylindrical members 47, 51, 57 and 76 (FIG. 1).

The sixth cylindrical member 87 has a peripheral surface 90 substantially tangent to the peripheral surface 79 of the fifth cylindrical member 76 and suitable to temporarily support and hold the finished straws 11, two by two axially aligned with each other (FIG. 7), parallel to the sixth axis of rotation X6 and angularly equidistant, from the adjacent pair, during the packaging thereof.

In particular, on the peripheral surface 90 of the sixth cylindrical member 87 is positioned the first thin film 80 (FIG. 8) coming from the first roll 82 and guided by first return rollers 91; then on the first thin film 80 are able to be deposited the straws 11 (FIG. 7) coming from the fifth cylindrical member 76 (FIG. 8) of the bending unit 20 and then the second thin film 81 coming from the second roll 83

(FIG. 8) and guided by second return rollers 92 is suitable to be deposited on the straws 11 (FIG. 7). A drawing roller 93 (FIGS. 1 and 8) is positioned in correspondence with the peripheral surface 90 of the sixth cylindrical member 87 to draw the first thin film 80 so that the latter is shaped to receive each straw 11 coming from the fifth cylindrical member 76 of the bending unit 20 immediately after.

The packaging unit 21 further comprises both first heat-welding means 94, configured to weld the two thin films 80 and 81 together transverse to the advance thereof toward a rotating support roller 95, and second heat-welding means 97, configured to weld the two thin films 80 and 81 together in a longitudinal direction, that is, parallel to the advance thereof toward the support roller 95.

Immediately downstream of the packaging unit 21, for example in a rear compartment of the machine 10, one or more collection containers of a known type are positioned, or which will be developed in the future, and not depicted in the drawings, where the finished and individually packaged straws 11 can be automatically deposited.

The machine 10 can comprise, at least in the front part thereof, a protective cover, not depicted in the drawings, suitable to protect all the working units 16, 17, 18, 19, 20 and 21 from pollutants, or contaminants, so that each relative working step can occur in a protected and safe place.

The operation of the machine 10 described heretofore, which also corresponds to the method for the automated production of straws 11, preferably made of paper, according to the present invention, occurs entirely in an automated manner under the control of the central control unit 29 (FIG. 8), which suitably controls all the aforementioned motor parts and the electric motor 61.

Briefly, the aforementioned method first comprises a starting step, in which all the aforementioned motor members and the electric motor 61 are actuated, so that the conveyor belt 33, the conveyor belt 39, all six cylindrical members 42, 47, 51, 57, 76 and 87, the circular blade 60 and the support roller 95 are brought into rotation simultaneously.

Then follows a feeding step, in which a plurality of tubular elements 12 (FIG. 2) is inserted into the machine 10, by means of the conveyor belt 33 (FIGS. 1 and 8), with the tubular elements 12 disposed on the latter also haphazardly, or randomly. The tubular elements 12 can be disposed on top of the conveyor belt 33 either manually, or in an automated manner, using any known technique, or which will be developed in the future.

The feed unit 16 automatically arranges in an orderly manner each tubular element 12 in a corresponding semi-cylindrical seating 45 of the first cylindrical member 42, distancing it from the first pitch P1 (FIG. 2) of the adjacent tubular element 12. This occurs by means of the distributor member 37 (FIG. 8), which vertically stacks, one above the other, the various tubular elements 12 coming from the conveyor belt 33, and the conveyor belt 29 which conveys the tubular elements 12 toward the first cylindrical member 42.

For ease of exposure and for a better understanding of the features of the machine 10 and the related method for the automated production of straws 11, the working steps of a single tubular element 12 are now described, from which two straws 11 are obtained, it being understood that the machine 10 is configured to simultaneously work a plurality of tubular elements 12, to produce more than 1,000 straws 11 per minute.

The feeding step ends with the automatic transfer of the tubular element 12 from the feed unit 16 to the distancing unit 17. Such a transfer occurs with a distancing step in which the tubular element 12 automatically passes from a semicylindrical seating 45 of the first cylindrical member 42 to a semicylindrical seating 50 (FIG. 1) of the second cylindrical member 47, so that the tubular element 12 is distanced from the adjacent tubular element 12 of the second pitch P2>P1.

Should the semicylindrical seatings 45 of the first cylindrical member 42 already have a certain pitch P2, the distancing unit 17 would not be necessary and therefore there would be no corresponding distancing step.

The possible distancing step is followed by a deformation step, which begins with the automatic transfer of the tubular element 12 into the third cylindrical member 51 of the deformation unit 18, where at least one bellows 13 is automatically formed in the element P. In the machine (1 described herein, two bellows 13 (FIG. 4) are formed simultaneously on each element 12, so as to then be able to obtain two straws 11 each having a bellows 13 equidistant from the midpoint M of the tubular element 12.

The deformation step occurs in any manner known, or to be developed in the future, and is therefore not described herein.

In a simplified version of the machine 10, not depicted herein, but easily understood by those skilled in the art, a single bellows 13 is formed on each tubular element 12 to make a single straw 11 therefrom.

Figure 8:
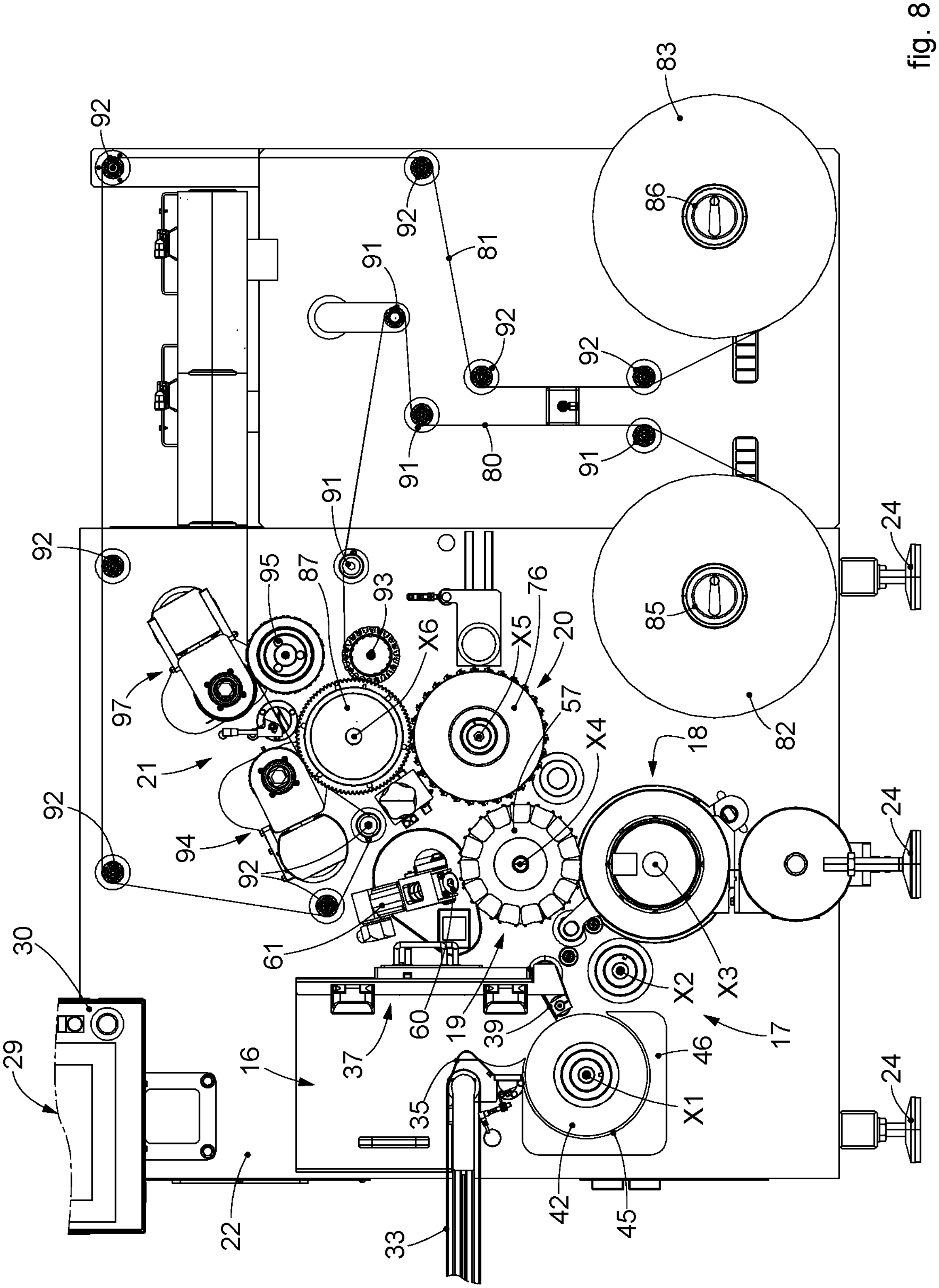
FIG. 8 is a front view of the machine of FIG. 1.

The deformation step is followed by a cutting step, which begins with the automatic transfer of the tubular element 12 into the cutting unit 19 (FIG. 8). Here the tubular element is inserted into two corresponding gripping elements, which temporarily hold it to bring it into contact, by means of the rotation of the fourth cylindrical member 57 around the fourth axis of rotation X4, with the circular blade 60 which is also rotating around the rotation axis thereof. During such insertion and until the cutting into two parts of the tubular element 12 is completed, the aforementioned two gripping elements are in the first operating position thereof, in close proximity. Immediately after cutting the tubular element 12, for the further rotation of the fourth cylindrical member 57, the two gripping elements are distanced from each other and are brought into the second operating position thereof, whereby the two halves of the tubular element 12 are detached from each other.

It is clear that if the tubular element 12 is provided with a single bellows 13, as may be provided in a simplified version of the machine 10, the cutting will occur in correspondence with one end of the tubular element 12 opposite that in which the bellows 13 is located. In this case, however, there would be the disadvantageous production of working waste. Furthermore, the hourly productivity of the machine 10 would be halved.

The two halves of the tubular element 12, which thus define two straws 11 equal and mirrored to each other, each provided with its own bellows 13 and an obliquely cut end 14, are then automatically transferred to the fifth cylindrical member 76 of the bending unit 20, where a bending step of each straw 11 occurs in correspondence with the bellows 13 thereof.

The bending step occurs in any manner known, or to be developed in the future, and is therefore not described herein.

At the end of the bending step, each of the two straws 11 has an overall length L2 (FIG. 6) which is less than half the length L1 of the tubular element 12 from which they were obtained.

The bending step is followed by a packaging step, which begins with the automatic transfer of the two straws 11 into the packaging unit 21 (FIG. 8). In particular, the two straws 11 automatically pass into the sixth cylindrical member 87, on which is already located the first thin film 80 coming from the first roll 82 drawn by the drawing roller 93.

With the rotation of the sixth cylindrical member 87 the two straws 11 are also brought into contact with the lower part of the second thin film 81, coming from the second roll 83. Thus, the two straws 11 are sandwiched between the two thin films 80 and 81. The latter, together with the two straws 11, continue toward the support roller 95 passing first under the first heat-welding means 94 and then under the second heat-welding means 97. Each straw 11 is thus individually hermetically packaged, thus it is protected before the use thereof.

The two straws 11, finished and packaged, are then detached and sent automatically to the two aforementioned collection containers.

From the foregoing description it is clear that the machine 10 described thus far is very compact and that all the working steps, from the feeding of the tubular elements 12, also haphazardly, to the collection of the finished and packaged straws 11, inserted into the films 80 and 81, which hygienically protect the same straws 11 until the use thereof, occur in total safety and automatically under the control of the central control unit 29, which can be programmed in any known manner, or which will be developed in the future.

It is clear that modifications and/or additions of parts or steps can be made to the machine 10 and to the relative method for the automated production of straws, preferably made of paper, described thus far, without departing from the scope of the present invention as defined by the claims.

It is further clear that although the present invention has been described with reference to a specific example of how the present invention can be realized, those skilled in the art will certainly be able to produce many other equivalent forms of machines and methods, having the features expressed in the claims and therefore all of which falling within the scope of protection defined thereby.

In the following claims, the reference numbers and symbols in parentheses have the sole purpose of facilitating the reading thereof and must not be considered as limiting factors as regards the scope of protection defined thereby.

The invention claimed is:

1. A machine comprising at least one feed unit configured to automatically feed a plurality of tubular elements toward a plurality of working units to make straws, said one or more working units comprising:

(i) a deformation unit configured to make at least one bellows on each of said tubular elements; and (ii) a cutting unit, configured to cut each of said tubular elements to make straws with bellows, wherein said deformation unit is disposed upstream of said cutting unit, with respect to an advancement direction of said tubular elements, so that said cutting unit cuts said tubular elements only after said deformation unit has made said bellows on said tubular elements, and wherein said cutting unit comprises both a cylindrical member rotating around an axis of rotation and provided with a plurality of gripping elements configured to temporarily hold said tubular elements, and a rotating circular blade configured to cut said tubular elements.

2. The machine as in claim 1, wherein said deformation unit is configured to make said at least one bellows as a flexible shaped portion defined by a succession of ridges and annular grooves obtained on said tubular elements.

3. The machine as in claim 1, wherein said deformation unit is configured to make two bellows distanced on each of said tubular elements before they are cut by said cutting unit.

4. The machine as in claim 3, wherein said cutting unit is configured to cut each of said tubular elements in a portion comprised between said two bellows.

5. The machine as in claim 1, wherein said cutting unit is disposed and configured so as to cut each of said tubular elements along a transverse direction with respect to a longitudinal extension of the tubular element, so as to make a pointed end.

6. The machine as in claim 1, wherein it further comprises a distancing unit disposed downstream of said feed unit and configured to distance said tubular elements from each other and take them to a determinate distance, at a constant pitch each one from the other.

7. The machine as in claim 1, wherein said feed unit is configured to convey said plurality of tubular elements, toward a further cylindrical member rotating around a further axis of rotation and provided with one or more peripheral seatings parallel to said further axis of rotation, each seating being configured to temporarily receive and hold one of said tubular elements.

8. The machine as in claim 7, wherein said feeding unit comprise at least one conveyor belt having a terminal portion disposed in the proximity of a distributor member configured to vertically stack one on top of the other said tubular elements coming from said conveyor belt to then exit, one at a time, toward said first further rotating cylindrical member.

9. The machine as in claim 1, wherein the axis of rotation of said circular blade and the axis of rotation of said cylindrical member form a determinate angle between them to obliquely cut, with respect to a longitudinal extension, said tubular elements.

10. The machine as in claim 9, wherein the axis of rotation of said circular blade and the axis of rotation of said cylindrical member form an angle comprised between 30° and 60°.

11. The machine as in claim 1, wherein said gripping elements are configured to move automatically and in an alternate manner, due to the rotation of said cylindrical member, parallel to the axis of rotation of said cylindrical member between a first operating position in which said gripping elements are closer to each other, before and during the cutting of the corresponding tubular element by said circular blade, and a second operating position in which said gripping elements are more distanced from each other, after said cutting.

12. The machine as in claim 11, wherein said gripping elements are moved between said first and second operating positions by means of a cam element provided on said cylindrical member.

13. A method to produce straws comprising a feeding step in which a plurality of tubular elements are fed toward a plurality of working units configured to perform corresponding workings on each of said tubular elements, in order to make said straws, wherein said working units allow to carry out at least:

a deformation step, during which at least one bellows is made on each of said tubular elements; and a cutting step, during which each of said tubular elements is cut to make said straws with bellows;

wherein said deformation step to make said at least one bellows is carried out before said cutting step to make said straws with bellows, and wherein said cutting step has been carried out by a rotating circular blade, which cuts said plurality of tubular elements temporarily held by a plurality of gripping elements provided on a cylindrical member rotating around an axis of rotation.

14. The method as in claim 13, wherein said deformation step said at least one bellows is made as a flexible shaped portion defined by a succession of ridges and annular grooves.

15. The method as in claim 13, wherein in said deformation step two bellows distanced from each other are made on each of said tubular elements.

16. The method as in claim 15, wherein in said cutting step each of said tubular elements is cut in a portion comprised between said two bellows.

17. The method as in claim 13, characterized in that it wherein said method further comprises a distancing step for distancing said tubular elements from each other and bringing them to a determinate distance, at a constant pitch each one from the other.

18. The method as in claim 13, wherein the tubular elements are made of paper.

* * * * *